United States Patent
Cheng et al.

(10) Patent No.: US 7,327,308 B2
(45) Date of Patent: Feb. 5, 2008

(54) PROGRAMMABLE METHOD AND TEST DEVICE FOR GENERATING TARGET FOR FMCW RADAR

(75) Inventors: Shih-Tung Cheng, Longtan Township, Taoyuan County (TW); Yao-Hwa Wen, Sinjhuang (TW); Ke-Tand Chien, Sindian (TW)

(73) Assignee: Chung Shan Institute of Science and Technology, Armaments Bureau, M.N.D., Taoyuan (TW)

( * ) Notice: Subject to any disclaimer, the term of this patent is extended or adjusted under 35 U.S.C. 154(b) by 127 days.

(21) Appl. No.: 11/117,939

(22) Filed: Apr. 28, 2005

(65) Prior Publication Data

US 2006/0244654 A1 Nov. 2, 2006

(51) Int. Cl.
- G01S 7/40 (2006.01)
- G01S 13/00 (2006.01)
- G01S 13/08 (2006.01)

(52) U.S. Cl. .................. 342/165; 342/101; 342/173; 342/178; 342/179; 342/118

(58) Field of Classification Search ........ 342/160–179, 342/101, 194, 118–134; 434/2, 4; 343/2, 343/4

See application file for complete search history.

(56) References Cited

U.S. PATENT DOCUMENTS

| | | | | |
|---|---|---|---|---|
| 2,928,085 A * | 3/1960 | Katz | ............................ | 342/87 |
| 4,146,890 A * | 3/1979 | Klensch | ........................ | 342/105 |
| 4,945,360 A * | 7/1990 | Trummer et al. | ............. | 342/122 |
| 5,160,264 A * | 11/1992 | Banura et al. | .................. | 434/2 |
| 5,191,337 A * | 3/1993 | Brovko et al. | ............... | 342/200 |
| 5,252,981 A * | 10/1993 | Grein et al. | ................. | 342/200 |
| 5,339,081 A * | 8/1994 | Jefferis et al. | ................ | 342/28 |
| 5,600,561 A * | 2/1997 | Okamura | ..................... | 701/300 |
| RE35,607 E * | 9/1997 | Nagamune et al. | ......... | 702/158 |
| 5,686,921 A * | 11/1997 | Okada et al. | ............... | 342/127 |
| 5,892,479 A * | 4/1999 | Mills et al. | .................. | 342/172 |
| 6,043,758 A * | 3/2000 | Snyder et al. | .............. | 340/970 |
| 6,067,041 A * | 5/2000 | Kaiser et al. | ............... | 342/171 |
| 6,075,480 A * | 6/2000 | Deliberis, Jr. | ............... | 342/169 |
| 6,232,910 B1 * | 5/2001 | Bell et al. | ...................... | 342/70 |
| 6,366,235 B1 * | 4/2002 | Mayer et al. | ................. | 342/70 |
| 6,400,308 B1 * | 6/2002 | Bell et al. | ...................... | 342/71 |
| 6,438,491 B1 * | 8/2002 | Farmer | ........................ | 701/301 |
| 6,611,227 B1 * | 8/2003 | Nebiyeloul-Kifle et al. | .......................... | 342/173 |
| 6,888,491 B2 * | 5/2005 | Richter | ........................ | 342/70 |
| 6,888,494 B2 * | 5/2005 | Tamatsu et al. | ............. | 342/128 |
| 7,061,424 B2 * | 6/2006 | Kuroda et al. | ................ | 342/70 |

(Continued)

Primary Examiner—Thomas H. Tarcza
Assistant Examiner—Hien Ly
(74) Attorney, Agent, or Firm—J.C. Patents (57) ABSTRACT

A test device for a frequency modulated continuous wave (FMCW) radar is provided. The test device has a central control unit for monitoring the FMCW radar. When the FMCW radar transmits a frequency modulated continuous signal to search for a target, the central control unit of the test device in present invention will simulate the motion of the target according to a plurality of setting parameters and generate an echo signal to the FMCW radar. The present invention also includes a first digital signal synthesizer and a transmitting unit. The first digital signal synthesizer is coupled to the central control unit for generating and transmitting an intermediate-frequency signal to the transmitting unit according to the settings in the central control unit and a reference clock. The transmitting unit generates the echo signal according to the intermediate-frequency signal.

20 Claims, 8 Drawing Sheets

U.S. PATENT DOCUMENTS

| | | |
|---|---|---|
| 7,110,435 B1* | 9/2006 | Sorrells et al. ............. 375/147 |
| 2002/0049539 A1* | 4/2002 | Russell et al. .............. 701/301 |
| 2003/0052813 A1* | 3/2003 | Natsume ...................... 342/70 |
| 2003/0146867 A1* | 8/2003 | Kornle et al. ............... 342/124 |
| 2003/0156055 A1* | 8/2003 | Tamatsu et al. .............. 342/70 |
| 2004/0066323 A1* | 4/2004 | Richter ........................ 342/70 |
| 2004/0252047 A1* | 12/2004 | Miyake et al. ............. 342/107 |
| 2005/0017891 A1* | 1/2005 | Kuroda et al. ................ 342/70 |
| 2005/0030935 A1* | 2/2005 | Seisenberger et al. ...... 370/350 |
| 2005/0116854 A1* | 6/2005 | Beez et al. .................... 342/70 |
| 2005/0179587 A1* | 8/2005 | Mosher et al. ............. 342/147 |
| 2005/0285774 A1* | 12/2005 | Wittenberg et al. ........... 342/70 |
| 2006/0092073 A1* | 5/2006 | Boecker et al. ............... 342/70 |
| 2006/0109169 A1* | 5/2006 | Winter et al. ................. 342/70 |
| 2006/0187112 A1* | 8/2006 | Nalezinski et al. ......... 342/118 |

* cited by examiner

PROGRAMMABLE METHOD AND TEST DEVICE FOR GENERATING TARGET FOR FMCW RADAR

BACKGROUND OF THE INVENTION

1. Field of the Invention

The present invention relates to a test device. More particularly, the present invention relates to a test device for generating target for a programmable frequency modulated continuous wave (FMCW) radar.

2. Description of the Related Art

A good test device is an important in the design of a good radar system, but using expensive equipment to test and obtain the parameters of a newly designed radar system is not desirable. In other words, using good and cheap setup to simulate the target and obtain the required parametric values of the radar system is the goal, which many design engineers are aiming at.

In the area of frequency modulated continuous wave (FMCW) radar design, an actual delay device is conventionally used to simulate the state of a target. However, the conventional technique is incapable not only of setting the dynamic distance or too large distance, but also of setting velocity and acceleration. In other words, the conventional simulation technique does not have much practical use. Furthermore, inside the delay device, expensive elements including the bulk acoustic wave delay line and the fiber optic delay line are used. Thus, carrying out the conventional simulation is a highly expensive undertaking.

SUMMARY OF THE INVENTION

Accordingly, at least one objective of the present invention is to provide a test device for a frequency modulated continuous wave (FMCW) radar capable of simulating the dynamic state of a target to test the FMCW radar using only a cheap hardware setup.

At least a second objective of the present invention is to provide a programmable method for generating target for a frequency modulated continuous wave (FMCW) radar that allows an operator to set up simulation parameters for simulating various possible dynamic states of the target.

To achieve these and other advantages and in accordance with the purpose of the invention, as embodied and broadly described herein, the invention provides a test device as a target simulator for generating target for a frequency modulated continuous wave (FMCW) radar. The programmable FMCW radar comprises a central control unit for monitoring the FMCW radar. When the FMCW radar transmits a frequency modulated continuous signal to search for a target, the central control unit of the test device in present invention will simulate the motion of the target according to a plurality of setting parameters and generate an echo signal to the FMCW radar. The present invention also includes a first digital signal synthesizer and a transmitting unit. The first digital signal synthesizer is coupled to the central control unit for generating and transmitting a first inter-frequency signal to the transmitting unit according to the settings in the central control unit and a reference clock. The transmitting unit receives the first inter-frequency signal to generate an echo signal.

In addition, the test device of the present invention further comprises an attenuator coupled to the central control unit and the transmitting unit to modulate the magnitude of the echo signal according to the control signals from the central control unit.

In the embodiment of the present invention, the central control unit comprises a host computer. The host computer has an application program serving as a man-machine interface for users to input the aforementioned setting parameters and computes the location of the target at every moment according to the setting parameters. Furthermore, the central control unit has a digital signal processing (DSP) module installed inside the host computer. The digital signal processing (DSP) module has a digital signal processor controls the first digital signal synthesizer and the frequency modulated continuous wave (FMCW) radar according to the output from the host computer. In the present invention, the digital signal processor may control the attenuator so that the magnitude of the echo signal can be modulated according to the location of the target as computed by the application program.

In the embodiment of the present invention, the setting parameters include the distance between the target and the frequency modulated continuous wave (FMCW) radar, the velocity and acceleration of the target, the sweeping model of the FMCW radar, the frequency channel used by the FMCW radar and the magnitude of the echo signal.

In the embodiment of the present invention, the first digital signal synthesizer has two operation modes. In a working mode, the first digital signal synthesizer increases the resolution of the distance between the simulated target and the FMCW radar. In a hopping frequency mode, the first digital signal synthesizer prevents inter-channel interference.

Furthermore, the aforementioned central control unit will couple with the FMCW radar for exchanging data. In the embodiment of the present invention, the format for exchanging data between the central control unit and the FMCW radar includes RS232.

In general, the FMCW radar will include a digital signal processing module, a second digital signal synthesizer and a transceiver module. The digital signal processing module is coupled to the central control unit so that data can be exchanged with the test device of the present invention. The second digital signal synthesizer is coupled to the digital signal processing module for generating a second inter-frequency signal according to the output from the digital signal processing module. The transceiver module is coupled to the second digital signal synthesizer for generating a frequency modulated continuous wave according to the second inter-frequency signal to look for the target. At the same time, the transceiver module receives the echo signal reflected back from the target and transmits the signal to the digital signal processing module to determine the actual location of the target.

In one preferred condition, the transceiver module will generate a reference clock signal and submit to the first digital signal synthesizer and the transmitting unit.

The present invention also provides a programmable method for generating target for a frequency modulated continuous wave (FMCW) radar suitable for a test system. The test system has a central control terminal. The programmable method includes the following steps. First, the test system is initialized. Then, a plurality of setting parameters is read from the central control terminal. According to the setting parameters, an internal setting is carried out to simulate the dynamic state of a target. When the FMCW radar emits a frequency modulated continuous wave to look for the target, an echo signal is transmitted to the FMCW radar according to the simulated target states. Thereafter, the test system will renew the setting parameters and capture the results of the FMCW radar in determining the simulated target. The results serve as a basis to users for adjusting the FMCW radar.

In the embodiment of the present invention, the steps for setting up the test system include the following. After setting the parameters, the test system will read out the latest setting parameters. Then, according to the latest setting parameters, the distance of separation between the target and the FMCW radar and the magnitude of the echo signal for the next round of simulation is computed.

In addition, the steps for renewing the setting parameters include returning the dynamic state information of the simulated target to the central control terminal and using the current state of the simulated target to renew the setting parameters.

In one preferred condition, after renewing the setting parameters, further includes the following steps. First, determine if the operating mode of the test system needs to be changed. If the operating mode needs to be changed, then the test system is reset again.

In brief, because a common desktop personal computer may serve as a central control terminal for the test system of the present invention, production cost is greatly reduced. Furthermore, the operator only has to input setting parameters to the application programs supplied by the central control terminal. Once the required setting parameters are provided, the test device of the present invention can simulate the dynamic states of a target.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
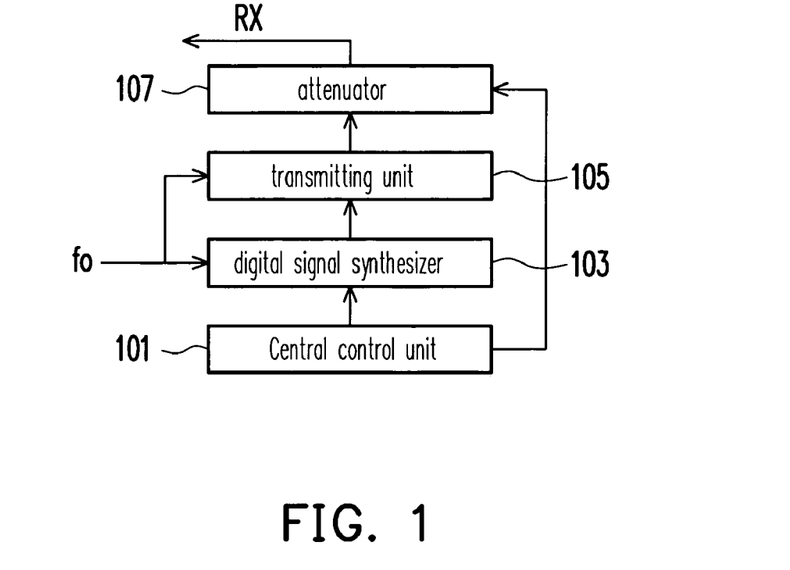
FIG. 1 is a block diagram showing the structure of a test device for FMCW radar according to one preferred embodiment of the present invention.

FIG. 1 is a block diagram showing the structure of a test device for FMCW radar according to one preferred embodiment of the present invention. As shown in FIG. 1, the test device provided by the present invention can be used for simulating the dynamic states of a target tracked by the FMCW radar, so that the test device is like a target simulator. When the FMCW radar transmits a frequency modulated continuous wave to look for a target, the test device as the target simulator can simulate the dynamic state of the target and transmit an echo signal to the FMCW radar. After receiving the echo signal, the FMCW radar can generate a set of results judging the location of the target using the delay time between transmission of the frequency modulated signal and the reception of the echo signal. Therefore, a user can compare the results with the actual data obtained through an actual simulation using the test device of the present invention and adjust the FMCW radar accordingly.

As shown in FIG. 1, the test device of the present invention comprises a central control unit 101 used not only for controlling the whole test device, but also for providing an interface of communication between an operator and the test device. The central control unit 101 is also used for monitoring the FMCW radar. Furthermore, according to the state of the FMCW radar, the central control unit 101 is used for controlling the digital signal synthesizer 103 to generate and transmit an intermediate-frequency signal f1 to the transmitting unit 105 according to a reference clock signal f0 for the intermediate frequency. After receiving the intermediate-frequency signal f1 generated by the digital signal synthesizer 103, the transmitting unit 105 generates a suitable echo signal RX to the FMCW radar.

To further the understanding of the spirit of the present invention, the theory behind the FMCW radar's measurement of distance to a target is explained in a concise way as follows.

Figure 2A:
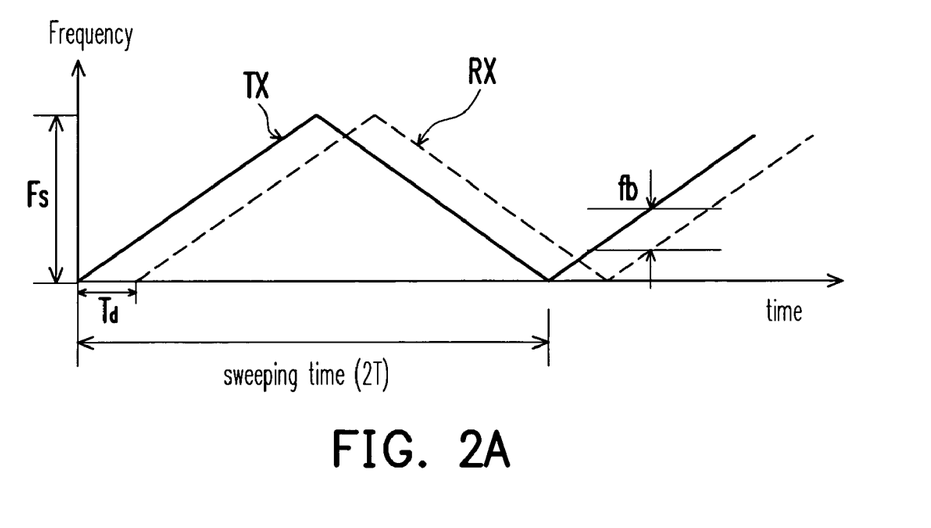
FIG. 2A shows the waveform of an ideal FMCW radar.

FIG. 2A shows the waveform of an ideal FMCW radar. As shown in FIG. 2A, the TX wave represents the frequency modulated continuous wave transmitted by the FMCW radar. The vertical axis of the coordinates represents the frequency of the sweeping frequency and the horizontal axis represents time. The following formula is obtained using similar triangle properties:

$$\frac{fb}{Fs} = \frac{Td}{T}, \tag{1}$$

where Fs is the largest sweeping frequency of the FMCW radar; fb is the difference in frequency between the frequency modulated continuous wave transmitted by the FMCW radar and the echo signal at the same time; T is time for the FMCW radar to sweep once; and Td is the delay time from the transmission of the frequency modulated continuous wave from the FMCW radar to the reception of the echo signal, which can be represented as 2R/c. Here, R represents the distance between the target and the FMCW radar and c is the velocity of light. The terms in equation (1) can be rearranged to produce the following equation:

$$R = \frac{fb \cdot c \cdot T}{2Fs}, \quad (2)$$

so that the distance R between the target and the FMCW radar is obtained.

Figure 2B:
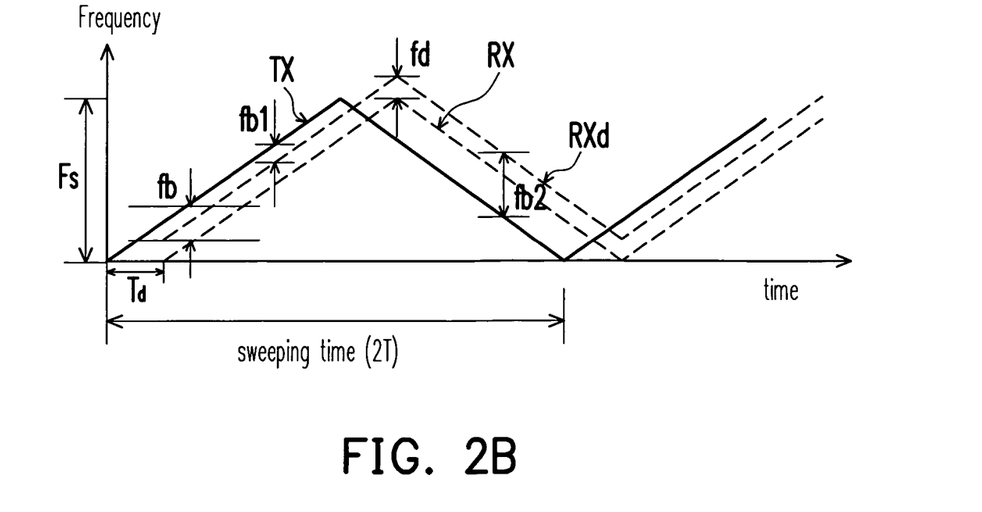
FIG. 2B shows the waveform of a FMCW radar under the actual condition.

In practice, the relationship between the frequency modulated continuous wave transmitted from the FMCW radar and the echo signal is unlike the simple graph drawn in FIG. 2A. The actual relationship will be similar to the graph shown in FIG. 2B, which shows the waveform under the actual condition. In the actual condition, when the radar emits an electromagnetic wave searching for a target, the Doppler effect resulting from a moving object will distort the echo signal. Hence, there is a Doppler shift factor fd between the ideal echo signal RX and the actual echo signal RXd. Therefore, to obtain the actual location of the target, some modifications to equation (2) have to be applied as follows:

$$fb = \frac{2R}{cT} Fs = kR, \text{ where } k = \frac{2Fs}{cT}.$$

Hence, the frequency difference fb1 and fb2 between the actual echo signal RXd and the frequency modulated continuous wave provided by the FMCW radar can be represented by the formulae:

$$fb1 = kR - fd$$

$$fb2 = kR + fd$$

From the above two formulae, the value of R is:

$$R = \frac{fb1 + fb2}{2k}$$

$$fd = \frac{fb2 - fb1}{2}$$

As shown in FIG. 1, according to the description in FIGS. 2A and 2B, when the FMCW radar emits a frequency modulated continuous wave searching for a target, the central control unit 101 can simulate the dynamic state of a target according to operator input setting parameters (more will be described in the following). Then, according to the dynamic state of the simulated target, central control unit 101 controls the digital signal synthesizer 103 to generate an intermediate-frequency signal f1. Thereafter, the transmitting unit 105 picks up the intermediate-frequency signal f1 to generate an echo signal RX and transmit the echo signal RX to the FMCW radar. The FMCW radar, according to the theory described in FIG. 2A, can determine the location of the target as simulated by the test device of the present invention. In the meantime, the operator may adjust the FMCW radar according to the correctness of the judgement by the FMCW radar.

To render the simulation closer to the actual condition, an additional attenuator 107 is installed at the output end of the transmitting unit 105 in the present invention. In practice, the magnitude of the echo signal RX is weaker the further the target is away from the FMCW radar. Hence, the central control unit 101 can control the attenuator 107 to adjust the magnitude of the echo signal RX according to the simulated dynamic state of the target.

In another selected embodiment, a spectrum analyzer is coupled to the transmitting unit 105. Thus, an operator can monitor the state of the echo signal output from the test device of the present invention through the spectrum analyzer.

Figure 3:
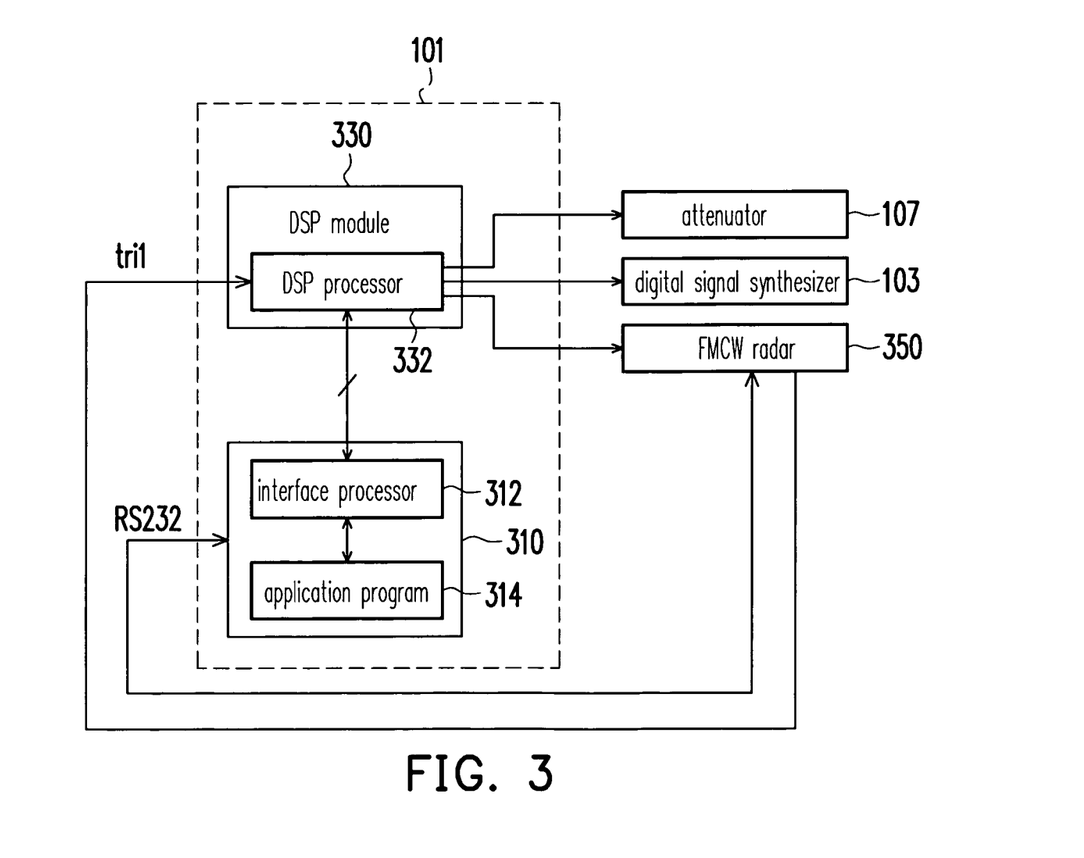
FIG. 3 is block diagram showing the internal structure of a central control unit according to one preferred embodiment of the present invention.

FIG. 3 is block diagram showing the internal structure of a central control unit according to one preferred embodiment of the present invention. As shown in FIG. 3, the central control unit 101 comprises a host computer 310 and a digital signal processing (DSP) module 330. The host computer 310 can be a desktop personal computer and the digital signal processing (DSP) module 330 is installed to the host computer 310 through an interface processor 312. In addition, application programs 314 are also installed in the host computer 310 for providing a man-machine interface between an operator and the test device of the present invention. Preferably, the application programs 314 are compiled using, for example, window type software such as the Visual C++ programming language developed by Microsoft whose details will be explained below. Furthermore, the host computer 310 is also coupled to the FMCW radar 350 for exchanging data. In the present embodiment, the host computer 310 exchanged data with the FMCW radar 350 in the RS232 format, for example.

The digital signal processing (DSP) module 330 further comprises a digital signal processor 332. The digital signal processor 332 monitors and controls the FMCW radar 350 and receives the triggering signal tri1 when the frequency modulated continuous wave is emitted. When the digital signal processor 332 receives the triggering signal tri1, the digital processor 332 controls the digital signal synthesizer 103 to generate an intermediate-frequency signal f1 and determines the output timing so that the echo signal generated when the frequency modulated continuous wave emitted by the FMCW radar 350 is reflected from a target is simulated. Finally, the FMCW radar 350 receives the echo signal to compute the time delayed, that is, Td in FIGS. 2A and 2B. Besides, the digital signal processor 332 also controls the attenuator 107 to adjust the magnitude of the echo signal RX emitted from the test device of the present invention and match the actual condition more closely.

Figure 4:
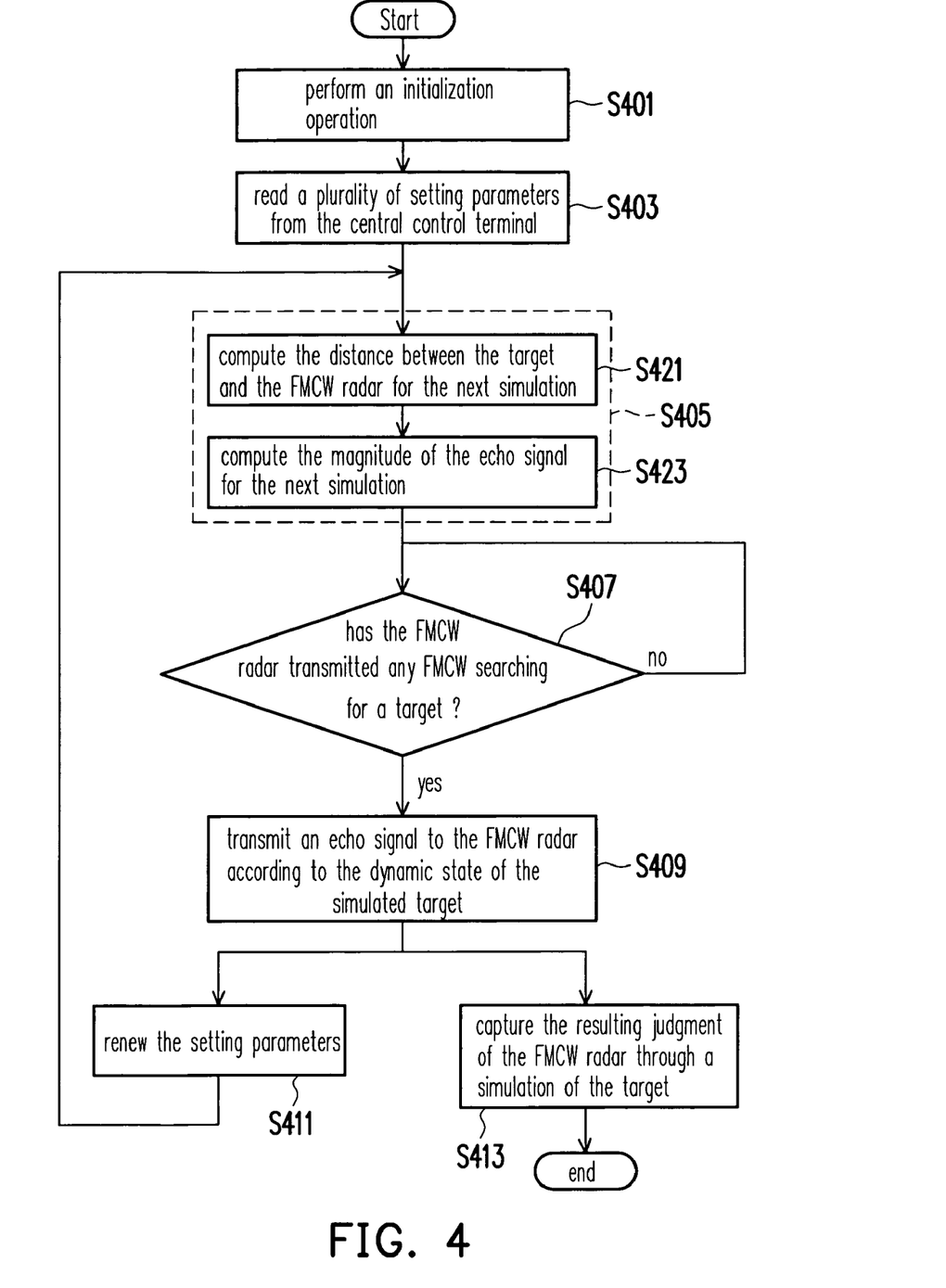
FIG. 4 is a flow diagram showing the steps in a target simulation for a programmable FMCW radar according to one preferred embodiment of the present invention.

FIG. 4 is a flow diagram showing the steps in a target simulation for a programmable FMCW radar according to one preferred embodiment of the present invention. As shown in FIG. 4, the programmable method for generating target of the present invention can be applied to the test device shown in FIG. 1. To provide a better understanding of the spirit of the present invention, FIGS. 1 and 4 are described together in the following. However, this should by no means limit the application of the programmable method to the test device shown in FIG. 1.

As shown in FIGS. 1 and 4, when the device in FIG. 1 starts to operate, step S401 must be carried out to perform an initialization. In other words, all the functional blocks in FIG. 1 are initialized. Thereafter, in step S403, the central control unit 101 at the central control terminal will read a plurality of setting parameters (more details in the following) provided by an operator. Then, in step S405, the test device of the present invention is set according to these setting parameters so that the dynamic state of a target can be simulated.

In the present embodiment, the step S405 further comprises a step S421 of having the central control unit computing the distance between the target and the FMCW radar for the next simulation. In the present invention, the method of computing the distance between the simulated target and the FMCW radar includes using the Newton's Law of motion as follows:

$$D(t) = Do + vt + \frac{1}{2}at^2, \quad (3)$$

where D is a distance function, v is the velocity, a is the acceleration, and t is the time. Through the aforementioned setting parameters, the test device is able to compute the distance between the target and the FMCW radar for the next simulation.

After computing the distance between the next simulated target and the FMCW radar, another step S432 of having the central control unit computing the magnitude of the next echo signal RX. In the present invention, there are two methods of setting the magnitude of the echo signal RX. The first method includes setting a fixed magnitude for the echo signal RX through the data from the central control unit 101. The second method is to use a modified radar formula to obtain the magnitude $S_{FE}$ of the echo signal RX:

$$S_{FE} = \frac{P_{CW} G_T G_R \lambda^2 \sigma_t}{(4\pi)^3 R^4 L},$$

where $P_{CW}$ represents the emission power of the continuous echo signal; $G_T$ and $G_R$ represent the antenna gains; $\lambda$ represents the wavelength of the echo signal RX; $\sigma_t$ represents the RADAR cross-section; L represents the amount of system system loss; and R represent the distance between the target and the FMCW radar.

Thereafter, in step S407, the central control unit 101 will determine whether the FMCW radar has transmitted a frequency modulated continuous wave to search for a target or not. If the central control unit 101 does not detect any frequency modulated continuous wave emission from the FMCW radar (the answer to the resulting inquiry in step S407 is 'no'), the step S407 is repeated. However, if the central control unit 101 detects the emission of a frequency modulated continuous wave from the FMCW radar (the answer to the resulting inquiry in step S407 is 'yes'), the central control unit 101 carries out step S409. That is, according to the simulated dynamic state of the target, the central control unit 101 will control the digital signal synthesizer 103 to generate an intermediate-frequency signal f1. Then, the transmitting unit 105 will generate an echo signal RX according to the intermediate-frequency signal f1 and then return the echo signal RX back to the FMCW radar. After that, in step S411, the central control unit 101 renews the setting parameters according to the simulated dynamic state of the target and then repeats step S405. In step S413, the operator can utilize the test device of the present invention to capture the resulting judgments by the FMCW radar on the simulated target and then using the judgements to adjust the FMCW radar.

In one preferred embodiment, the test device of the present invention further includes supplying the most recent states of the simulated target into the central control unit 101 so that the central control unit 101 can renew the originally stored setting parameters.

In another selected embodiment, the central control unit 101 will further judge if the operating mode of the digital signal synthesizer 103 needs to be changed at the completion of the step S411. In a preferred embodiment, the digital signal synthesizer 103 has two operating modes, namely, a working mode and a frequency-hopping mode, whose operations will be described in more detail below.

Figure 5A:
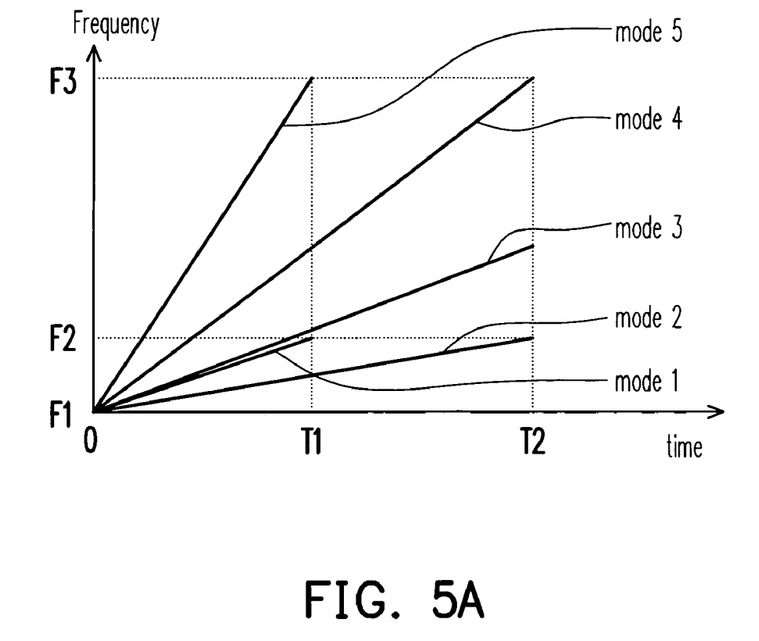
FIG. 5A is a frequency versus time graph in a working mode according to one preferred embodiment of the present invention.

FIG. 5A is a frequency versus time graph in a working mode according to one preferred embodiment of the present invention. As shown in FIG. 5A, the working mode of the digital signal synthesizer 103 mainly serves to boost distance resolution. In FIG. 5A, the vertical axis of the coordinate represents the sweeping frequency and the horizontal axis represents the time. In the present embodiment, the working mode of the digital signal synthesizer 103 is further divided into 5 modes labeled 1~5 in FIG. 5A. In general, a higher sweeping frequency represents a higher resolution. However, in most operations, a lower sweeping frequency is used when the target is far away.

Figure 5B:
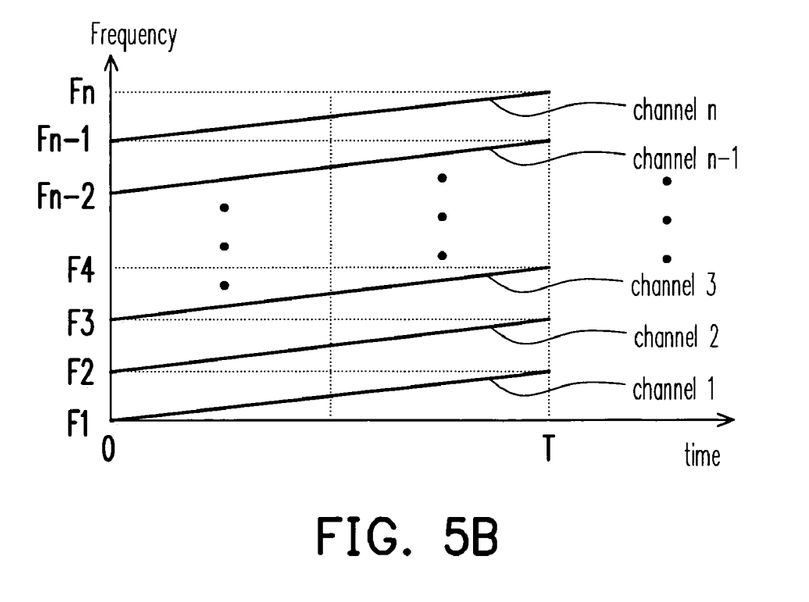
FIG. 5B is a frequency versus time graph in a hopping frequency mode according to one preferred embodiment of the present invention.

FIG. 5B is a frequency versus time graph in a hopping frequency mode according to one preferred embodiment of the present invention. To prevent inter-channel interference, the digital signal synthesizer 103 generally must include a hopping frequency design. In FIG. 5B, the vertical axis of the coordinates represents the operating frequency and the horizontal axis represents the time. In the present embodiment, the digital signal synthesizer 103 provides altogether n channels for switching.

Figure 6A:
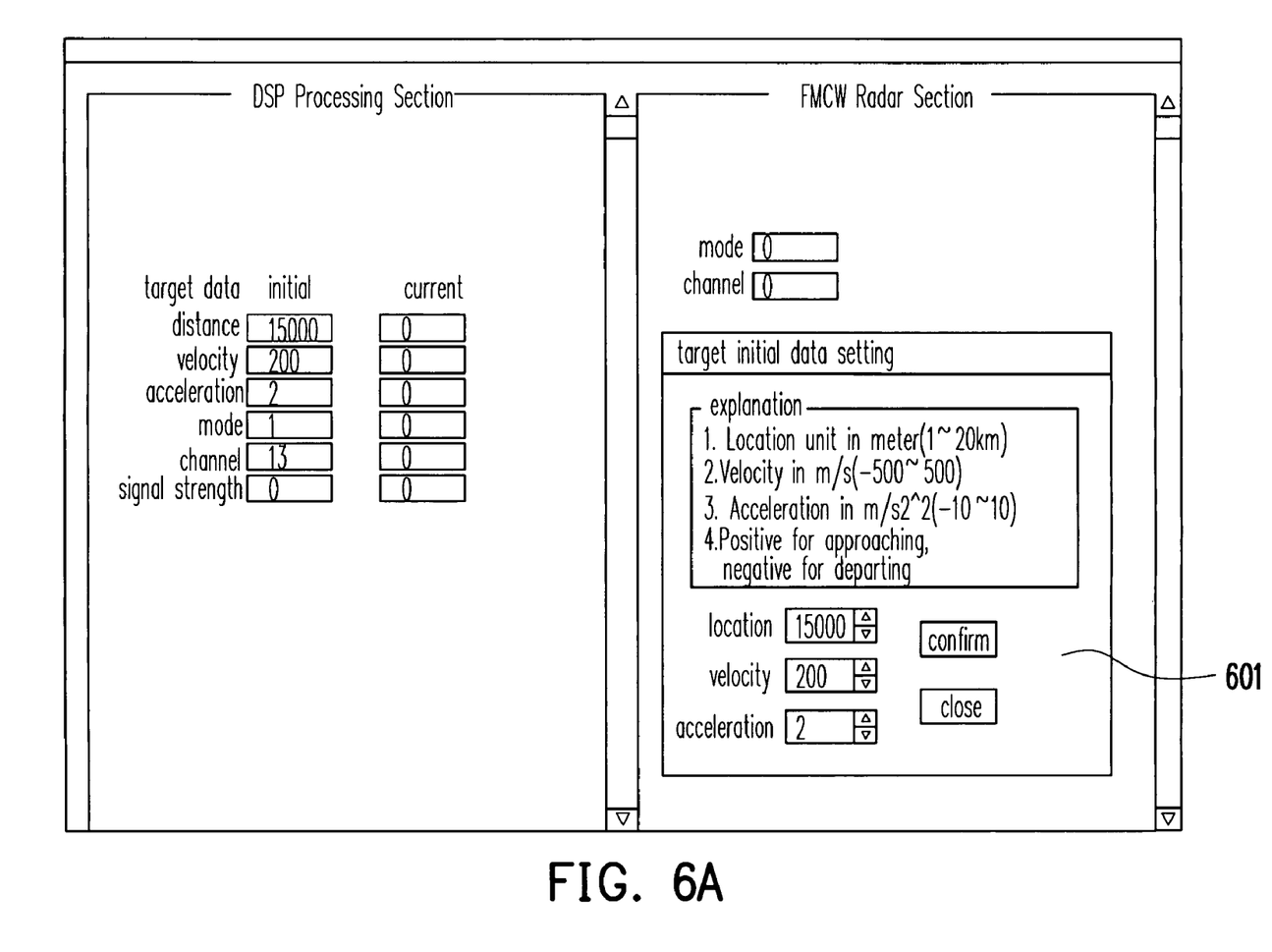
FIGS. 6A through 6C are diagrams showing the steps for inputting setting parameters through a man-machine interface provided by the present invention.
Figure 6B:
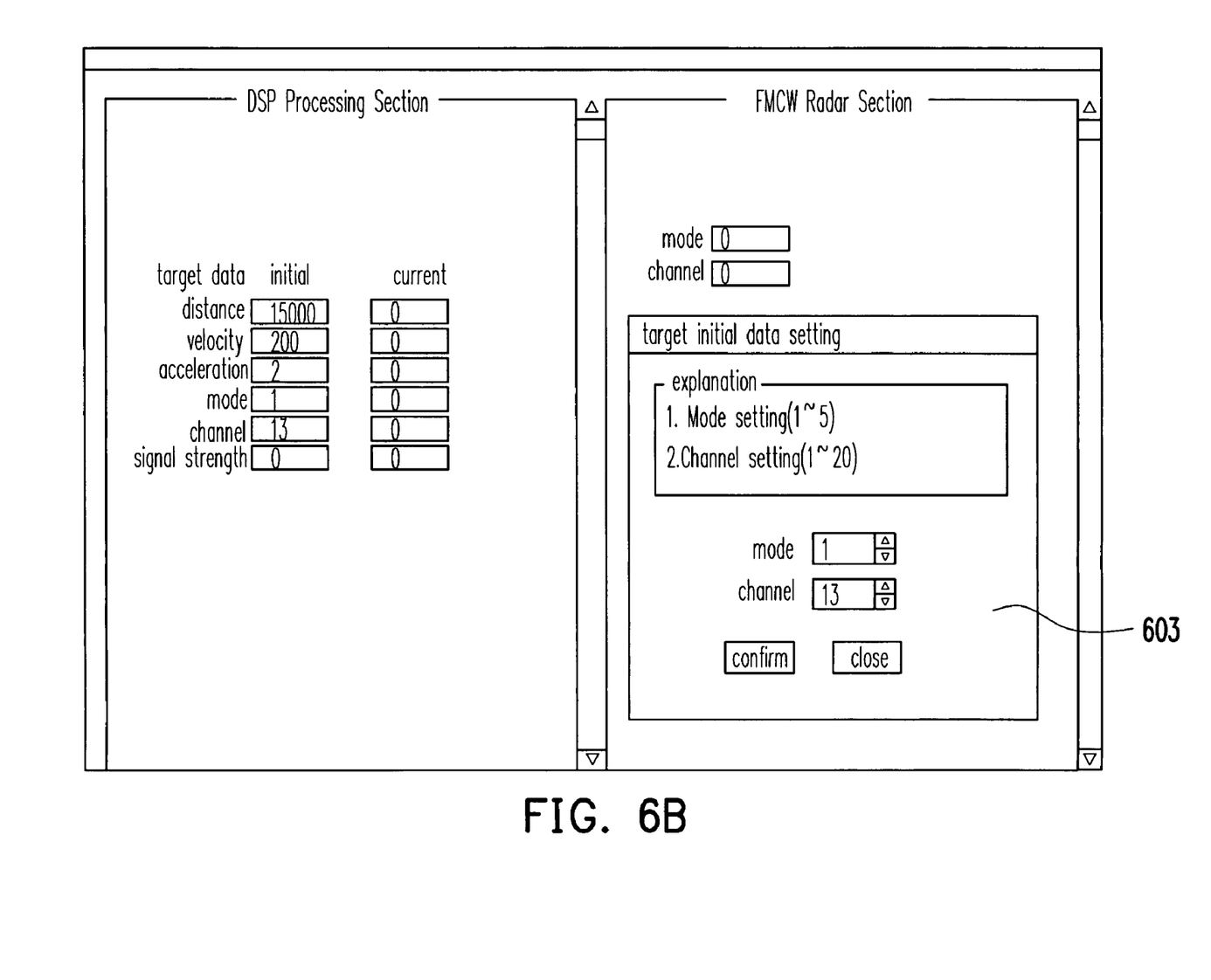
Figure 6C:
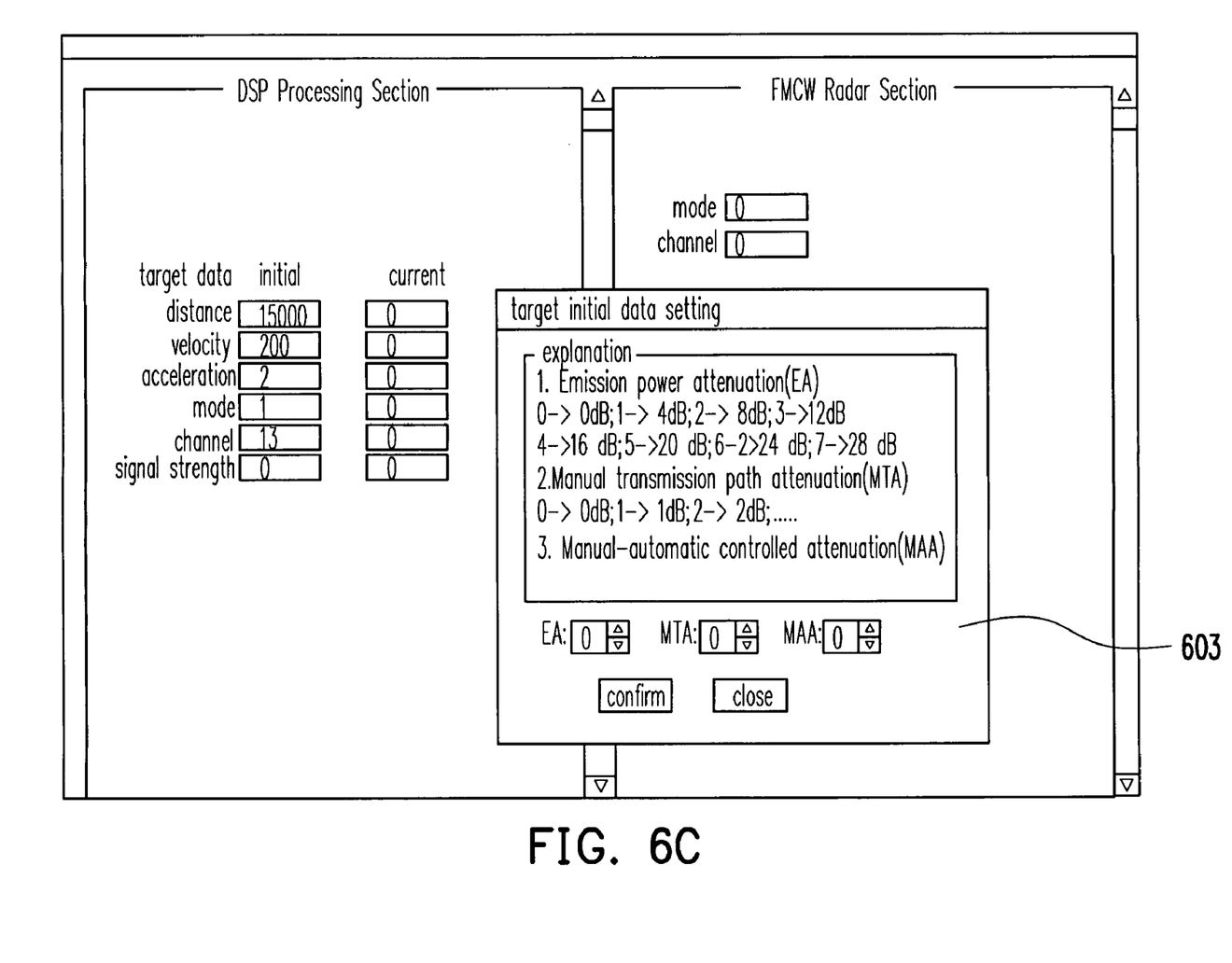

In the following an embodiment is described to illustrate the method of operating the test device of the present invention. FIGS. 6A through 6C are diagrams showing the steps for inputting setting parameters through a man-machine interface provided by the present invention. As shown in FIG. 6A, the man-machine interface of the test device in the present invention includes fields for inputting distance, velocity, acceleration, mode, frequency channel and signal strength. Furthermore, each field is sub-divided into an initial value and a current value. The value in the distance field represents the distance between simulated target and the FMCW radar and has a default value of 15000, for example; the value of the velocity and acceleration represent the velocity and acceleration of the simulated target and has a default value of 200 and 2, for example; the mode and the channel field represent the working mode and the frequency channel of the digital signal synthesizer 103 shown in FIG. 1 and has a default value of 1 and 13, for example; the value in the signal strength field represents the magnitude of the echo signal and has a default value of 0, for example. In addition, the initial value data represents the state of the simulated target at a time equal to zero. The current value data represents the state of an object at the end of a period simulated according to the setting parameters. Assume the time is 2 seconds and the motion of the simulated target is close to the FMCW radar in FIG. 6A, then the distance, velocity and acceleration are renewed according to the equation (3). Furthermore, the operator may call out the conversational frame 601 for setting the initial value of the distance, velocity and acceleration fields.

The operator can also call out a conversational frame 603 as shown in FIG. 6B to set the working mode and the frequency channel of the digital signal synthesizer 103 as shown in FIG. 1. In addition, the operator can perform a sensitivity test through another conversational frame 605 as shown in FIG. 6C.

Figure 7:
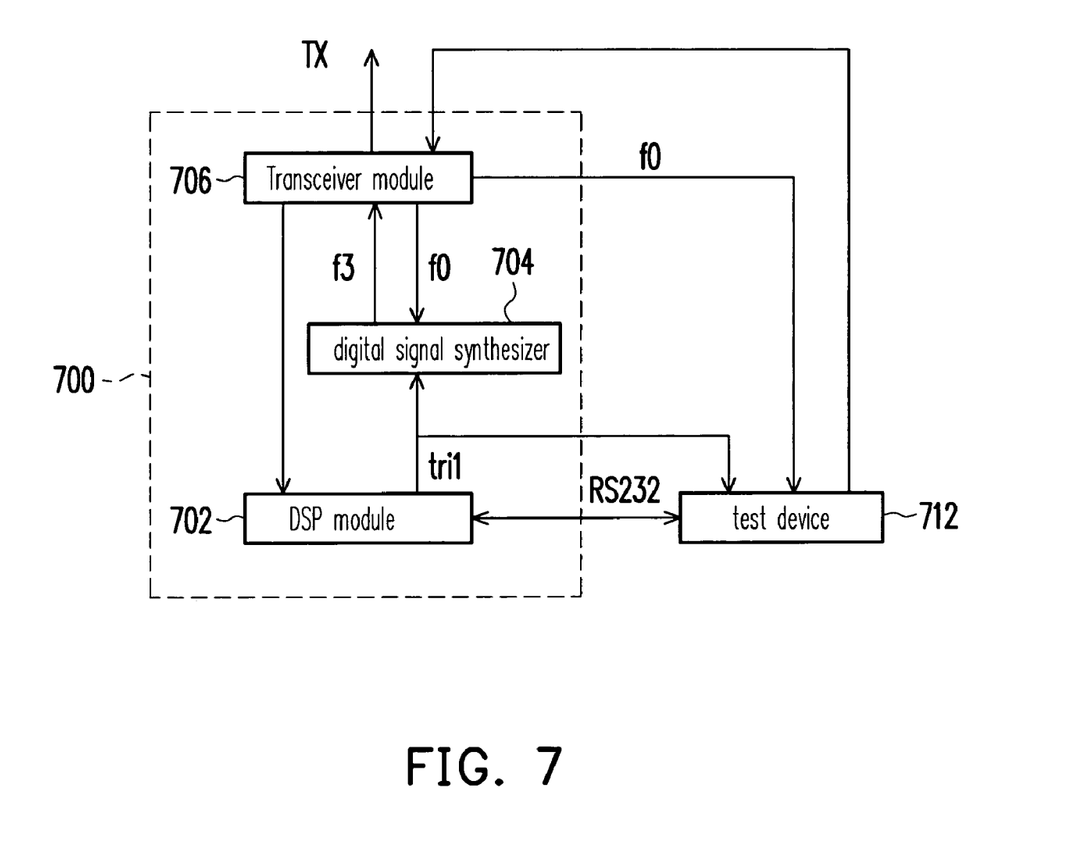
FIG. 7 is a block diagram showing the internal structure of one type of FMCW radar.

FIG. 7 is a block diagram showing the internal structure of one type of FMCW radar. As shown in FIG. 7, the FMCW radar 700 in the present embodiment can use the test device in FIG. 1 for carrying out an inspection. However, anyone familiar with the technologies may notice that the application of the test device of the present invention is not limited to the FMCW radar 700 in FIG. 7.

The FMCW radar 700 has a digital signal processing (DSP) module 702 for controlling the whole FMCW radar 700. The DSP module 702 is also coupled to the signal synthesizer 704 provided by the present invention so that data can be exchanged between the two through RS232 ports, for example. Furthermore, when the FMCW radar 700 transmits a frequency modulated wave TX searching for a target, the digital signal processing (DSP) module 702 will generate a trigger signal tri1 and transmit the signal to the test device 712. In addition, the triggering signal tri1 output from the DSP module 702 will be transmitted to the digital signal synthesizer 704 as well. After receiving the triggering signal tri1, the digital signal synthesizer 704 will generate an intermediate frequency signal f3 to the transceiver module 706 according to a reference clock signal f0. According to the intermediate frequency signal f3, a transceiver module 706 will generate the frequency modulated continuous wave TX to search for a target. Moreover, the transceiver module 706 can be used for receiving the echo signal reflected from the target and transmitting the received echo signal to the DSP module 702 for determining the location of the target. In the meantime, the transceiver module 706 can also generate a reference clock signal f0 and transmit the clock signal f0 to the test device 712 of the present invention and the digital signal synthesizer 704.

In another selected embodiment, the transceiver module 706 is coupled to a spectrum analyzer so that an operator can monitor the state of the frequency modulated continuous wave generated by the transceiver module 706.

In summary, major advantages of the present invention at least include:
1. The present invention uses simple equipment such as a personal computer to simulate the dynamic state of a target object. Thus, the cost of the equipment and the fee for maintaining the equipment is low in the present invention.
2. Because the operator is permitted to set the motion parameters of various types of target, the present invention has a wide scope of applications.
3. The application programs in the central control terminal can be compiled using window type software. Hence, the present invention can provide a user-friendly man-machine interface for communicating with the operator.
4. The clock signal generated by the transceiver module is not RF signal but inter-frequency signal, and the clock signal is provided to the digital signal synthesizer and the test device so that the whole system would be synchronous.
5. The present invention is applied for the FMCW radar.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A test device for a programmable frequency modulated continuous wave (FMCW) radar, comprising:
   a central control unit for monitoring the FMCW radar, being comprised of a host computer and a digital signal processing (DSP) module having a digital signal processor, wherein the central control unit can control the test device to simulate the dynamic state of a target according to a plurality of setting parameters when the FMCW radar transmits a frequency modulate continuous wave to search for the target, and then the central control unit will generate an echo signal and transmit the echo signal to the FMCW radar;
   a first digital signal synthesizer coupled to the central control unit for generating a first intermediate frequency signal according to the setting in the central control unit and a reference clock signal; and
   a transmitting unit coupled to the first digital signal synthesizer for receiving the first intermediate frequency signal and generating the echo signal, wherein the test device is characterized in that the frequency modulate continuous wave has a second intermediate frequency that is generated in accordance with the reference clock signal, the digital signal processor receives a triggering signal from the FMCW radar when the FMCW radar transmits the FMCW and output timing for generating the echo signal after a delay time defined from the transmission of the frequency modulated continuous wave from the FMCW radar to the reception of the echo signal, and in different simulations, the different echo signals are transmitted after different delay times.

2. The test device of claim 1, further comprises an attenuator coupled to the central control unit and the transmitting unit for adjusting the magnitude of the echo signal according to the setting in the central control unit.

3. The test device of claim 1, wherein
   the host computer has an application program for providing a means of inputting the setting parameters by a user and computing the location of the target at each moment according to the setting parameters; and
   the digital signal processing (DSP) module having the digital signal processor is used to control the first digital signal synthesizer and the FMCW radar according to the output from the host computer.

4. The test device of claim 3, wherein the host computer includes a desktop personal computer.

5. The test device of claim 1, wherein the setting parameters comprises the distance between the target and the FMCW radar, the velocity and acceleration of the target, the working mode of the digital signal synthesizer and the magnitude of the echo signal.

6. The test device of claim 1, wherein the digital signal synthesizer has two operating modes comprising:
   a working mode for increasing the resolution of the distance between the target and the FMCW radar; and
   a hopping-frequency mode for preventing inter-channel interference.

7. The test device of claim 1, wherein the central control unit is coupled to the FMCW radar for data exchange.

8. The test device of claim 7, wherein the data exchange format between the central control unit and the FMCW radar includes RS232.

9. The test device of claim 1, wherein the FMCW radar further comprising:
   a digital signal processing (DSP) module coupled to the central control unit for exchanging data with the test device;
   a second digital signal synthesizer coupled to the digital signal processing (DSP) module for generating the second intermediate-frequency signal according to the output from the digital signal processing (DSP) module and the reference clock signal; and
   a transceiver module coupled to the second digital signal synthesizer for generating the frequency modulated continuous wave searching for a target according to the second intermediate-frequency signal, and then receiving the echo signal and transmitting the echo signal to the digital signal processing (DSP) module so that the location of the target can be computed according to the echo signal data.

10. The test device of claim 9, wherein the transceiver module can be used to generate the reference clock signal and transmit the reference clock signal to the first digital signal synthesizer and the transmitting unit.

11. The test device of claim 9, wherein the FMCW radar further comprises a spectrum analyzer for inspecting the signal output from the transceiver module.

12. The test device of claim 1, wherein the transmitting unit is also coupled to a spectrum analyzer used for inspecting the signal output from the transmitting unit.

13. A programmable method for generating target for frequency modulated continuous wave (FMCW) radar suitable for a test device having a central control terminal, the testing method comprising the steps of:
   performing an initialization operation;
   reading a plurality of setting parameters from the central control terminal;
   setting the test device according to the setting parameters so that the dynamic state of a target can be simulated;
   transmitting an echo signal to the FMCW radar according to the state of the simulated target when the FMCW radar transmits a frequency modulated continuous wave searching for the target, wherein the echo signal and the frequency modulated continuous wave are a first intermediate frequency signal and a second intermediate frequency signal, respectively, which are generated according to a reference clock signal;
   renewing the setting parameters; and
   capturing the resulting judgment generated by the FMCW radar through a simulation on the target and using the judgment to adjust the FMCW radar, wherein the programmable method is characterized in that the central control terminal is comprised of a host computer and a digital signal processing module having a digital signal processor, the digital signal processor receives a triggering signal from the FMCW radar when the FMCW radar transmits the FMCW and output timing for generating the echo signal after a delay time defined from the transmission of the frequency modulated continuous wave from the FMCW radar to the reception of the echo signal, and in different simulations, the different echo signals are transmitted after different delay times.

14. The programmable method of claim 13, wherein the step of setting the test device comprising:
   reading the latest setting parameters;
   computing the distance between the target and the FMCW radar for the next simulation; and
   computing the magnitude of the echo signal for the next simulation.

15. The programmable method of claim 13, wherein an operator inputs the setting parameters.

16. The programmable method of claim 13, wherein the step of renewing the setting parameters further comprises sending the dynamic state of the simulated target back to the central control terminal and using the current state of the simulated target to renew the setting parameters.

17. The programmable method of claim 16, wherein the setting parameters comprises the distance between the simulated target and the FMCW radar, the velocity and acceleration of the simulated target, the working mode and the operating channel of the test device and the magnitude of the echo signal.

18. The programmable method of claim 13, wherein after renewing the setting parameters, further comprising:
   judging whether to switch the operating mode or not; and
   setting the test device anew if the operating mode needs to be switched.

19. The programmable method of claim 18, wherein the operating mode of the test device comprising:
   a working mode for increasing the resolution of distance between the simulated target and the FMCW radar; and
   a hopping-frequency mode for preventing inter-channel interference.

20. The programmable method of claim 13, wherein the central control terminal has an application program for providing a man-machine interface.

* * * * *